US012445804B2

(12) United States Patent
Smith et al.

(10) Patent No.: US 12,445,804 B2
(45) Date of Patent: Oct. 14, 2025

(54) SYSTEM AND METHOD OF DETERMINING REAL-TIME LOCATION

(71) Applicant: DENSO International America, Inc., Southfield, MI (US)

(72) Inventors: Eric J. Smith, Holland, MI (US); Kyle Golsch, Pontiac, MI (US)

(73) Assignee: DENSO International America, Inc., Southfield, MI (US)

( * ) Notice: Subject to any disclaimer, the term of this patent is extended or adjusted under 35 U.S.C. 154(b) by 165 days.

(21) Appl. No.: 17/497,460

(22) Filed: Oct. 8, 2021

(65) Prior Publication Data

US 2022/0030395 A1 Jan. 27, 2022

Related U.S. Application Data

(63) Continuation of application No. 16/713,358, filed on Dec. 13, 2019, now Pat. No. 11,146,919.

(60) Provisional application No. 62/779,744, filed on Dec. 14, 2018.

(51) Int. Cl.
*H04W 4/029* (2018.01)
*H04W 76/10* (2018.01)

(52) U.S. Cl.
CPC .......... *H04W 4/029* (2018.02); *H04W 76/10* (2018.02)

(58) Field of Classification Search
CPC ..... H04W 4/029; H04W 76/10; H04W 4/023; H04W 76/15
See application file for complete search history.

(56) References Cited

U.S. PATENT DOCUMENTS

| 8,947,202 | B2 | 2/2015 | Tucker et al. | |
|---|---|---|---|---|
| 9,351,102 | B2 | 5/2016 | Tucker et al. | |
| 10,638,404 | B1 | 4/2020 | Chenault et al. | |
| 2004/0218602 | A1* | 11/2004 | Hrastar | H04L 67/125 370/390 |
| 2006/0276201 | A1* | 12/2006 | Dupray | H04W 4/029 455/456.1 |
| 2011/0060669 | A1 | 3/2011 | Laves | |
| 2015/0103766 | A1 | 4/2015 | Mikiós et al. | |
| 2015/0245231 | A1 | 8/2015 | Jarvis et al. | |
| 2015/0382186 | A1 | 12/2015 | Saito et al. | |
| 2016/0245716 | A1* | 8/2016 | Gum | G01L 27/002 |
| 2016/0272154 | A1* | 9/2016 | Sanji | B60R 25/24 |
| 2016/0310329 | A1* | 10/2016 | Patel | A61F 13/42 |
| 2017/0237814 | A1 | 8/2017 | Zhang | |
| 2017/0303080 | A1 | 10/2017 | Stitt et al. | |

(Continued)

OTHER PUBLICATIONS

International Search Report and the Written Opinion of the International Searching Authority for International Application No. PCT/US2019/066256 mailed Mar. 17, 2020.

*Primary Examiner* — Dinh Nguyen
(74) *Attorney, Agent, or Firm* — Warner Norcross + Judd LLP

(57) ABSTRACT

A system and method for determining location information of a portable device relative to an object is provided. The system and method may include communicating with a secondary portable device separate from the portable device, which may be considered a primary portable device. The secondary portable device may be not be configured to communicate with the object or unaware that it is communicating with the object, and may receive communication parameters from the primary portable device.

20 Claims, 8 Drawing Sheets

(56) References Cited

U.S. PATENT DOCUMENTS

| | | |
|---|---|---|
| 2018/0020421 A1 | 1/2018 | Kumar et al. |
| 2018/0124860 A1 | 5/2018 | Moritomo |
| 2018/0192460 A1 | 7/2018 | Huh |
| 2019/0052314 A1* | 2/2019 | Caruana .................. H01Q 5/25 |

\* cited by examiner

SYSTEM AND METHOD OF DETERMINING REAL-TIME LOCATION

FIELD OF THE INVENTION

The present application relates to a system and method for determining location information with respect to a portable device and an object, such as a vehicle.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentication, and security access for authorization.

One conventional RTLS in the automotive realm includes a transceiver or master controller located within a vehicle and capable of communicating via radio frequency (RF) with a portable device. One or more aspects of the communications between the master controller and the portable device, such as signal strength of the communications, may be monitored and used as a basis for determining a location of the portable device relative to the vehicle. For instance, if the signal strength of communications is low, the portable device may be farther away from the vehicle relative to communications where the signal strength is high. In general, the strength of communications drops off as the distance increases between the portable device and the vehicle. Based on this or other measurements of a signal characteristic of communications, a location of the portable device may be determined.

In use, there are many factors that may affect the accuracy of the location determination based on communications with the portable device. For instance, the location determination may utilize a locator function trained to determine a location of the portable device based on communications from the portable device. Training of the locator function may be conducted in a plurality of environments to achieve accuracy within a degree of confidence for the plurality of environments. However, presence of one or more objects absent from the plurality of environments, or absence of one or more objects included in at least one of the plurality of environments, or a combination thereof, can adversely affect accuracy of the trained locator function. For instance, one person's garage may include several objects not present during training, and that cause reflections of wireless communications that adversely affects a location determination.

One conventional RTLS can be compromised by relay attacks. An attacker may be a person that would like to authorize a state of the vehicle using the RTLS without actual authorization to do so. To compromise the RTLS to incorrectly authorize a state (e.g., as entry to the vehicle), the attacker may establish a wireless relay in proximity to the vehicle's RTLS. This way, communications may be established via the relay with an authorized portable device but the location of the portable device, from perspective of the RTLS of the vehicle, may appear to be the location of the relay. The RTLS of the vehicle may not be aware that the authorized portable device is not in proximity to the vehicle because the communications from the authorized portable device, from the perspective of the vehicle, emanate from the relay and not the actual location of the authorized portable device.

SUMMARY

A system and method are provided for determining location information of a portable device relative to an object is provided. The system and method may include communicating with a secondary portable device separate from the portable device, which may be considered a primary portable device. The secondary portable device may not be initially configured to communicate with the object, and may receive communication parameters from the primary portable device.

In one embodiment, a secondary portable device for communicating with a primary portable device and an object is provided. The secondary portable device may include an antenna system and a controller. The antenna system may be configured to communicate wirelessly with the primary portable device and the object, where the primary portable device and the object are configurable to communicate wirelessly via a primary communication link. The controller may be operably coupled to the antenna system, and configured to receive one or more connection parameters from the primary portable device. The one or more connection parameters may pertain to a configuration for wireless communication with the object. The controller may be configured to communicate wirelessly with the object based on said connection parameters received from the primary portable device.

In one embodiment, the secondary portable device is unaware of communications with the primary portable device being received and monitored by the object. Alternatively, the secondary portable device may establish a wireless connection with the object based on the one or more connection parameters, such that the secondary portable device is aware that it is communicating with the object.

In one embodiment, a primary portable device is provided to facilitate operation of an object. The primary portable device may include an antenna system configured to communicate wirelessly with the object via a primary communication link, where the antenna system may be configured to communicate wirelessly with a secondary portable device separate from the primary portable device. The primary portable device may include a memory to store one or more connection parameters for communicating wirelessly with the object.

The primary portable device may include a controller operably coupled to the antenna system, and configured to direct wireless communications with the object via the antenna system. A location of the primary portable device may be determined based on the wireless communications with the object. The controller may be configured to transmit the one or more connection parameters to the secondary portable device, whereby the secondary portable device is operable to communicate wirelessly with the object based on the one or more connection parameters.

In one embodiment, a method of authorizing an object state is provided. The method may include providing an object device in a fixed position relative to the object, and establishing a primary wireless communication link between a primary portable device and the object device. The method may also include transmitting, from the primary portable device to a secondary portable device, one or more connection parameters pertaining to wirelessly communicating to facilitate at least one of location detection and presence detection with respect to the secondary device. The secondary portable device may wirelessly transmit communications based on the one or more connection parameters. The method may include authorizing the object event based on wireless communications transmitted via the primary wireless communication link and wirelessly transmitted communications from the secondary portable device.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
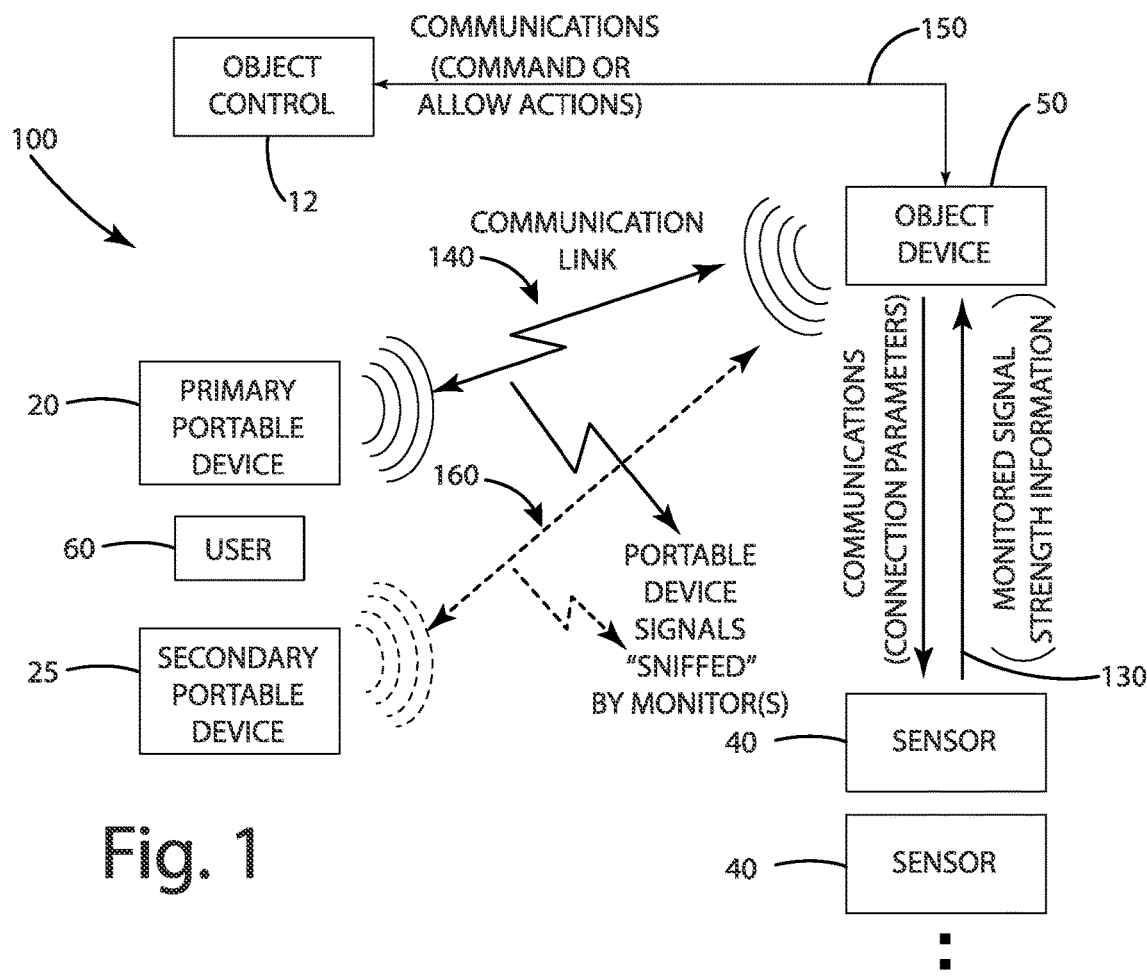
FIG. 1 shows a representative view of a system in accordance with one embodiment.

A system and method for determining location information of a portable device relative to an object is provided. The system and method may include communicating with a secondary portable device separate from the portable device, which may be considered a primary portable device. The secondary portable device may not be initially configured to communicate with the object, and may receive communication parameters from the primary portable device.

In one embodiment, a location of the secondary portable device may be determined based on communications with the secondary portable device and compared against a determined location for the primary portable device to confirm both devices are in the same zone before at least one of authenticating the primary portable device and authorizing a state of the object, such as a command or an action. The object may determine that the location of the secondary portable device and the location of the portable device are in the same zone but different, indicating that a relay attack is not present because the relay would likely emanate communications from both devices from the same position. Variances in signal characteristics with respect to the primary and secondary portable devices may be indicative of a difference in location but similar or the same zones.

A zone as discussed herein may be pre-defined with respect to the object. Alternatively, a zone may be dynamically defined in use. For instance, a zone may be defined as a union or combined zone between spherical regions approximately 2 feet in diameter relative to each of the primary and secondary portable devices. In one embodiment, if there is no intersection between the two spherical regions, then no combined zone may be present.

In one embodiment, a location of the secondary portable device may be determined based on communication from the secondary portable device. This determined location may be compared against a location determined for the primary portable device to enhance a degree of confidence for the location determination of the primary portable device. For instance, the secondary portable device may be a type of device expected to be carried or worn by a user in conjunction with the primary portable device. By confirming the location of the secondary portable device is similar to a determined location of the primary portable device, or comparing the location of the secondary portable device to a determined location of the primary portable device, the degree of confidence with respect to the location determinations can be increased under the assumption (considered likely) that both the primary and secondary portable devices are carried or worn by the same person and therefore in proximity to each other.

In one embodiment, under the assumption (considered likely) that the primary and secondary portable devices are carried or worn by the same person, the system may condition authorization for an object state based on a location of the primary portable device and presence of the secondary portable device. Presence of the secondary portable device may be determined by the object device and/or by the primary portable device, which may attest to the object device that the secondary portable device is present in proximity to the primary portable device.

I. System Overview

Figure 2:
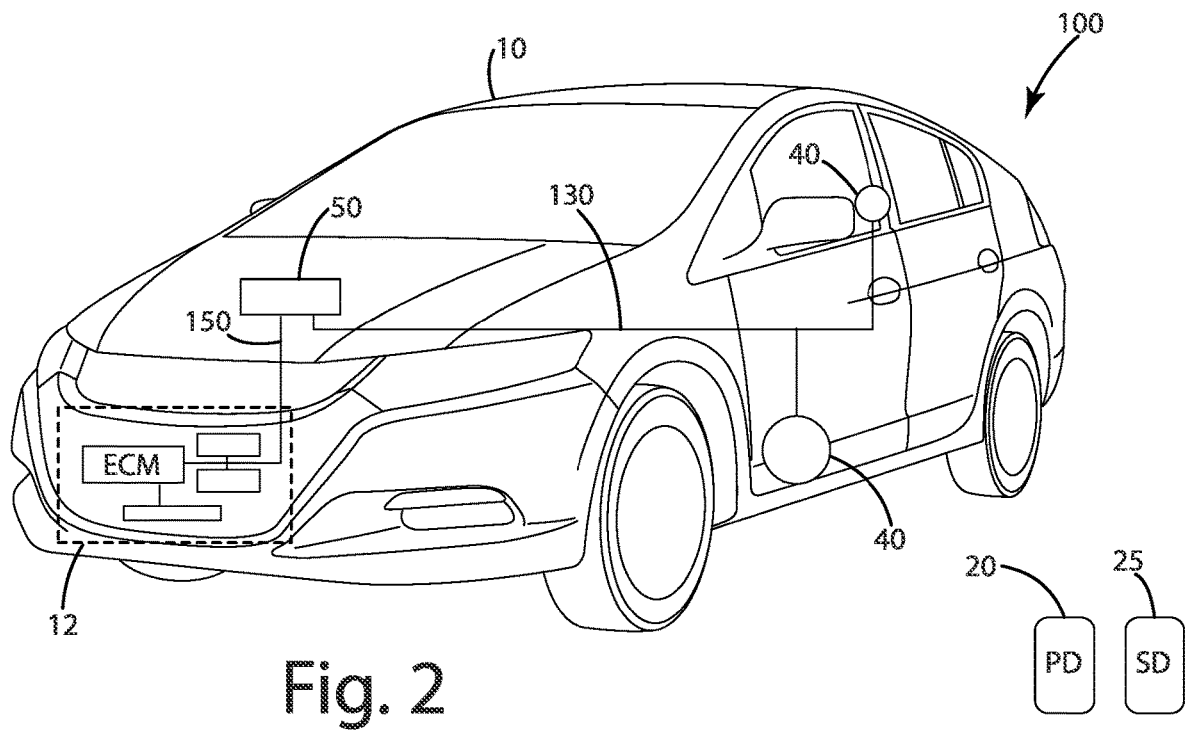
FIG. 2 depicts a representative view of the system in FIG. 1 disposed at least in part on an object.

A system in accordance with one embodiment is shown in the illustrated embodiment of FIGS. 1 and 2 and generally designated 100. The system 100 may include one or more system components as outlined herein. A system component may be a user 60 or an electronic system component, which may be the primary portable device 20, a secondary portable device 25, a sensor 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the primary portable device 20, the secondary portable device 25, the sensor 40, and the object device 50. The features described in connection with the object device 50 depicted in FIG. 3 may be incorporated into the primary portable device 20, the secondary portable device 25, or the sensor 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus; however, it is to be understood that the communication network is not so limited. The communication network may be any type of network, including a wired or wireless network, or a combination of two or more types of networks.

Figure 3:
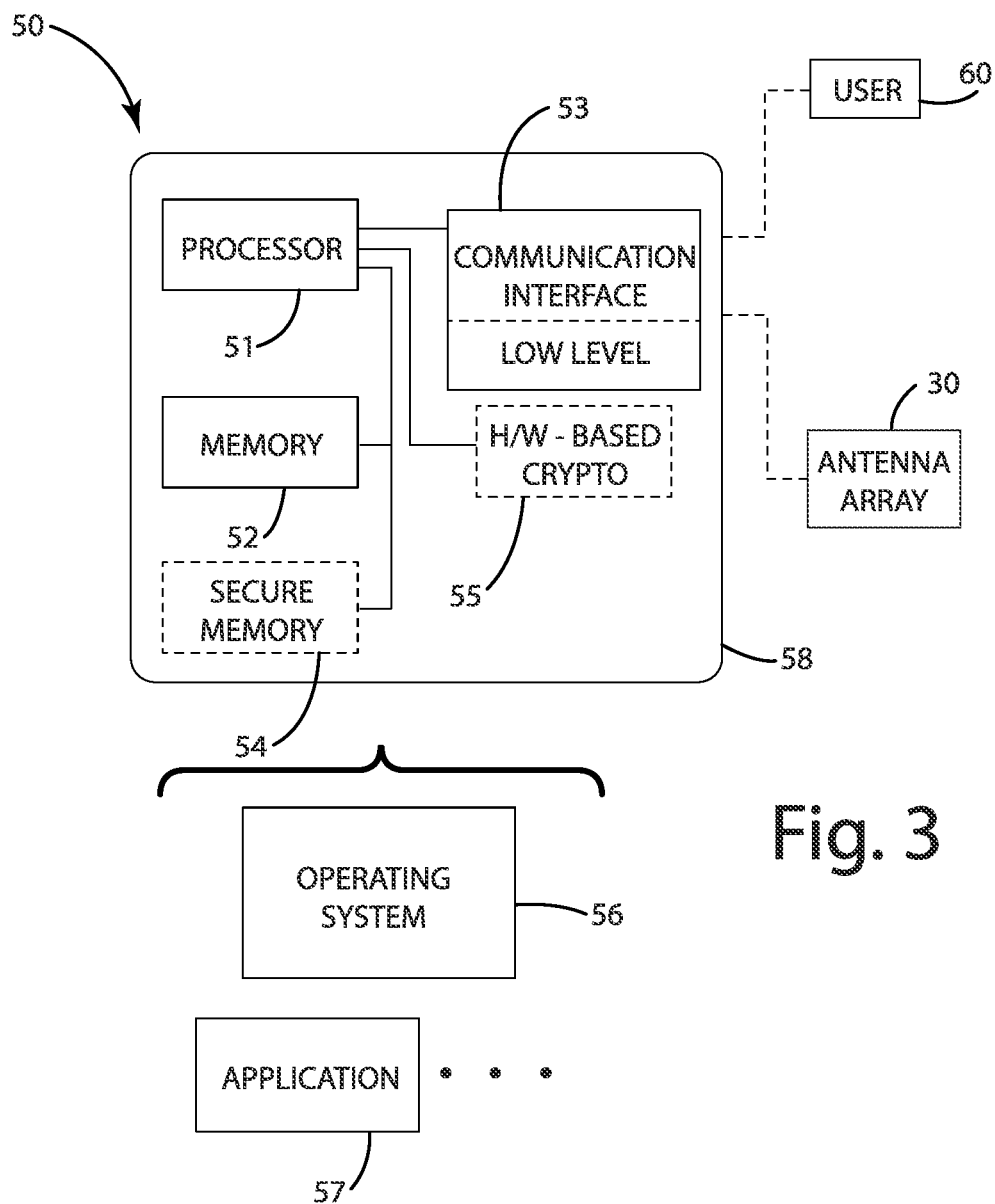
FIG. 3 shows a system component in accordance with one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the primary portable device 20, the secondary portable device 25, or the sensor 40, or both, may similarly include a controller 58 configured to control operation or aspects of the respective system component.

The controller 58 may include electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including Bluetooth Low Energy (BTLE) communications.

As another example, the communication interface 53 may provide a wireless communication link with another system component in the form of the primary portable device 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50.

For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the primary portable device 20 or the secondary portable device 25, or both. In the illustrated embodiment of FIGS. 1 and 2, the user 60 may carry the primary portable device 20 (e.g., a smartphone). The system 100 may facilitate locating the primary portable device 20 or the secondary portable device 25 with respect to the object 10 (e.g., a vehicle) in real-time with sufficient precision to determine whether the user 60 is located at a position at which access to the object 10 or permission for an object command should be granted.

For instance, in an embodiment where the object 10 is a vehicle, the system 100 may facilitate determining whether the primary portable device 20 or the secondary portable device 25 is outside the vehicle but in close proximity, such as within 5 feet, 3 feet, or 2 feet or less, to the driver-side door 14. This determination may form the basis for identifying whether the system 100 should unlock the vehicle. On the other hand, if the system 100 determines the primary portable device 20 or the secondary portable device 25 is outside the vehicle and not in close proximity to the driver-side door (e.g., outside the range of 2 feet, 3 feet, or 5 feet), the system 100 may determine to lock the driver-side door. As another example, if the system 100 determines the primary portable device 20 or the secondary portable device 25 is in close proximity to the driver-side seat but not in proximity to the passenger seat or the rear seat, the system 100 may determine to enable mobilization of the vehicle. Conversely, if the primary portable device 20 or the secondary portable device 25 is determined to be outside close proximity to the driver-side seat, the system 100 may determine to immobilize or maintain immobilization of the vehicle.

The object 10 may include multiple object devices 50 or variant thereof, such as an object device 50 including a sensor 40 coupled to an antenna array 30, in accordance with one or more embodiments described herein.

Micro-location of the primary portable device 20 or the secondary portable device 25 may be determined in a variety of ways, such as using information obtained from a global positioning system, one or more signal characteristics of communications from the primary portable device 20 or the secondary portable device 25, and one or more sensors (e.g., a proximity sensor, a limit switch, or a visual sensor), or a combination thereof. An example of micro-location techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIGS. 1-3, the object device 50 (e.g., a system control module (SCM)) and a plurality of sensors 40 (coupled to an antenna array 30 as shown in FIG. 3) may be disposed on or in a fixed position relative to the object 10. Example use cases of the object 10 include the vehicle identified in the prior example, or a building for which access is controlled by the object device 50.

The primary portable device 20 may communicate wirelessly with the object device 50 via a communication link 140. Optionally, the secondary portable device 25 may communicate wirelessly with the object device 50 via a communication link 160, shown in phantom lines as optional in FIG. 1. The communication link 160 may be similar to the communication link 140, as described herein.

The plurality of sensors 40 may be configured to sniff the communications of the communication link 140 between the primary portable device 20 and the object device 50 to determine one or more signal characteristics of the communications, such as signal strength, time of arrival, time of flight, or angle of arrival, or a combination thereof. In one embodiment, the plurality of sensors 40 may be configured to sniff the communications of the communication link 160 between the secondary portable device 25 and the object device 50 to determine one or more signal characteristics of the communications. At least one of the primary portable device 20, the secondary portable device 25, and the object device 50 may be operable to determine one or more signal characteristics of the communications via one or both of the communication link 140 and the communication link 160.

In an alternative embodiment, the primary portable device 20 or the secondary portable device 25 may establish communications with another device other than the object device 50, but at least one of the object device 50 and the one or more sensors 40 may be configured to sniff these communications to determine a location of the respective device relative to the object 10.

The determined signal characteristics may be communicated or analyzed and then communicated to the object device 50 via a communication link 130 separate from the communication link between the primary portable devices 20 and the object device 50. Additionally, or alternatively, the primary portable device 20 and/or the secondary portable device 25 may establish a direct communication link with one or more of the sensors 40, and the one or more signal characteristics may be determined based on this direct communication link.

Figure 10:
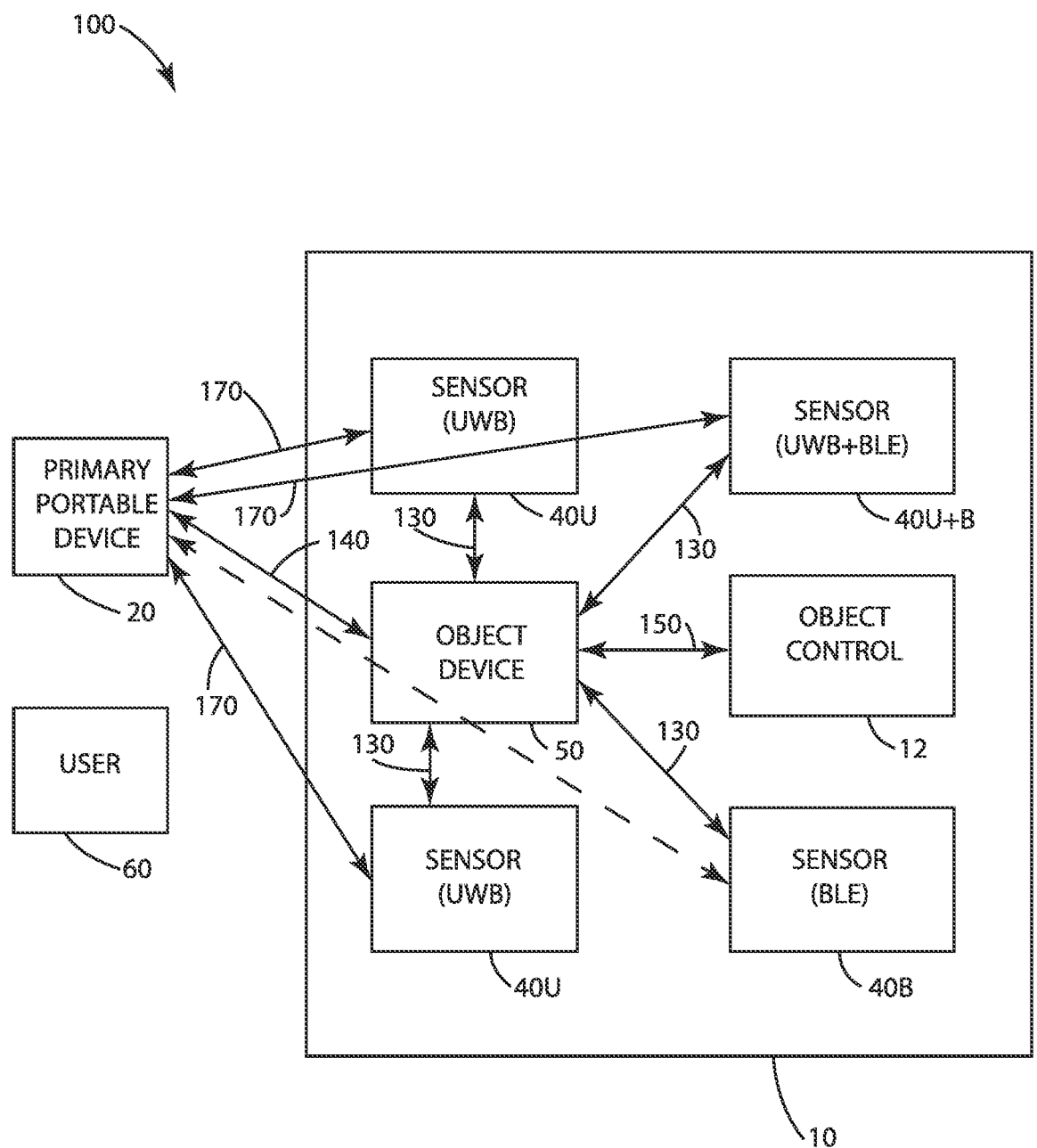
FIG. 10 shows a system in accordance with one embodiment of the present disclosure.

For instance, an alternative configuration of the system 100 is shown in the illustrated embodiment of FIG. 10. The system 100 may include a primary portable device 20, a user 60, and an object 10, similar to the system described in conjunction with FIG. 1. The object 10 in accordance with one embodiment may include an object device 50, an object control 12, and a plurality of sensors, which may be similar to the sensors 40 described herein.

In the illustrated embodiment, the primary portable device 20 may include both Ultra Wide Band (UWB) and BTLE communication capabilities. For instance, the primary portable device 20 may be a portable device in the form of a smartphone with both UWB and BLE radios.

The system 100 in the illustrated embodiment of FIG. 10 may include one or more sensors 40 (which may also be described as anchors) that are disposed on the object 10. The one or more sensors 40 may be disposed in a variety of positions on the object 10, such as the positions described herein, including for instance, one or more sensors 40 in the door panel and one or more other sensors in the B pillar, as shown and described in connection with FIG. 2.

One or more of the sensors 40 may be operable to communicate via at least one communication link according to a communication protocol. The communication link may be established via one or more channels. As described in connection with FIG. 2, the sensor 40 may be operable to communicate by sniffing or receiving communications via at least one communication link 140 established between the object device 50 and the primary portable device 20, such that the sensor 40 does not transmit communications via the communication link 140. This type of communication for the sensor 40 is shown in phantom lines in FIG. 10.

However, one or more sensors 40 in the system 100 of FIG. 10 may be operable to communicate by transmitting and receiving communications via at least one communication link 170 established directly with the primary portable device 20. In this way, the sensor 40 may directly communicate with the primary portable device 20. The at least one communication link 170 may include communications according to more than one protocol (e.g., BTLE and UWB).

The one or more sensors 40 of the system 100 in the illustrated embodiment of FIG. 10 may be operable to a) sniff communications with respect to the communication link 140 between the primary portable device 20 and the object device 50, or b) directly communicate with the primary portable device 20 via the at least one communication link 170. The communication capabilities of the one or more sensors 40 in the illustrated embodiment is identified in the figure and by a letter designation U for UWB and B or BTLE. For example, the sensor 40U is an ultra-wideband anchor responsive to UWB signals; sensor 40U+B is responsive to both UWB and BTLE communications; and sensor 40B is a BTLE anchor.

It is to be understood that an object 10, such as a vehicle, may include more sensors 40 than shown in the illustrated embodiment of FIG. 10. Depending on the implementation, some number of anchors may be integrated in a vehicle. For instance, 3 to 10 anchors with both UWB and BTLE capabilities may be provided.

In one embodiment, UWB, similar to BTLE, is a standardized communication protocol (see IEEE 802.15.4a/z). One way in which UWB may differ from BTLE is with respect to ranging applications. UWB may involve transmitting short duration pulses that allow for time-of-flight functions to be used to determine the range from the primary portable device 20 to one or more sensors 40U, 40U+B (e.g., anchors). Then the object device 50 may use a lateration function and/or a multilateration function to determine localization with respect to the primary portable device 20 (e.g., the location of the primary portable device 20 relative to the object 10). Lateration and/or multilateration may involve processing a set of ranges from the primary portable device 20 to each sensor 40 to output a position estimate of the primary portable device 10 relative to the object 10). The primary portable device 20 and the UWB-enabled sensors 40U, 40UB may transmit and receive packets of data back-and-forth, enabling a time-of-flight determination with respect to such communications.

The system 100 in the illustrated embodiment of FIG. 10 may include at least two different communication links for determining localization. For instance, the communication link 140 may utilize BTLE-based localization, and the communication link 170 may utilize UWB-based localization. In the illustrated embodiment, the communication link 170 is designated with respect to each of the sensors 40U, 40U+B; however, it is to be understood that each of these communication links 170 may not be the same. For instance, each of the communication links 170 may be separate (e.g., a separate channel or band).

Utilizing multiple communication links for localization may provide a number of benefits.

For instance, in a configuration in which both BTLE and UWB information are obtained, this information can be combined to enhance and stabilize a localization estimate. The BTLE and UWB channels used in the localization may involve different frequencies, and the signal characteristics to be exploited for ranging are different (RSSI for BTLE and time-of-flight for UWB).

RSSI ranging calibration may be augmented or supplemented with time-of-flight from UWB communications. This augmentation or supplemental use of time-of-flight may be conducted in real-time by the system 100, or conducted in a manner to adapt a model that uses sensed information not based on UWB communications (e.g., only sensed information with respect to BTLE communications).

For instance, one embodiment according to the present disclosure may be directed toward calibrating out variance of RSSI or range calculations. BTLE+UWB capable primary portable devices 20 may be tested to build up a map of BTLE communication characteristics, UWB communication characteristics, and ranging or localization data. A BTLE-only primary portable device 20 may be operable to process such maps but without UWB communications characteristics to refine RSSI-only range estimates. For instance, the locator 210 may be based on both BTLE+UWB communication characteristics; however, in practice, the locator 210 may generate location information based on BTLE communication characteristics without the UWB communication characteristics. Alternatively, the locator 210 may be based on BTLE communication characteristics, and may be operable in practice to generate location information based on both UWB and BTLE communication characteristics. It is to be understood that BTLE or UWB, or both, may be replaced with another type of communication protocol.

The primary portable device 20, in one embodiment, can establish a direct communication link 170 with one or more of the sensors 40U, 40U+B, and the one or more signal characteristics (e.g., time-of-flight) may be determined based on this direct communication link 170.

In one embodiment, the secondary portable device 25 described herein may communicate with the object 10 in manner similar to the primary portable device 20. The secondary portable device 25 may directly establish direct communications with one or more of the object device 50 and sensors 40U, 40B, 40U+B. Such direct communication may occur alternative to or in addition to direct communications between the primary portable device 20 and one or more of the object device 50 and sensors 40U, 40B, 40U+B. For instance, a direct communication link 170 depicted in FIG. 10 may be formed between the sensor 40U and the secondary portable device 25. The secondary portable device 25 is not shown in FIG. 10 for purposes of clarity, but is should be understood that the communication links shown in conjunction with primary portable device 20 in FIG. 10 may be provided additionally in conjunction with the secondary portable device 25. It is also to be understood that the communication links with the primary and secondary portable devices 20, 25 may be shared or different from each other. For instance, a first direct communication link 170 may be provided between the sensor 40U and the primary portable device 20, and a second direct communication link 170 may be provided between the same sensor 40U and the secondary portable device 25. The first and second direct communication links 170 may be the same or may be different (e.g., using different channels or bands).

As described herein, one or more signal characteristics, such as signal strength, time of arrival, time of flight, and angle of arrival, may be analyzed to determine location information about the primary portable device 20 or the secondary portable device 25 relative to the object 10, an aspect of the object 10, or the object device 50, or a combination thereof. For instance, time difference of arrival or the angle of arrival, or both, among the sensors 40 and the object device 50 may be processed to determine a relative position of the primary portable device 20 or the secondary portable device 25. The positions of the one or more antenna arrays 30 relative to the object device 50 may be known so that the relative position of the primary portable device 20 can be translated to an absolute position with respect to the antenna arrays 30 and the object device 50.

Additional or alternative examples of signal characteristics may be obtained to facilitate determining position according to one or more algorithms, including a distance function, a trilateration function, a triangulation function, a lateration function, a multilateration function, a fingerprinting function, a differential function, a time of flight function, a time of arrival function, a time difference of arrival function, an angle of departure function, a geometric function, etc., or any combination thereof.

II. Secondary Portable Device

Figure 4:
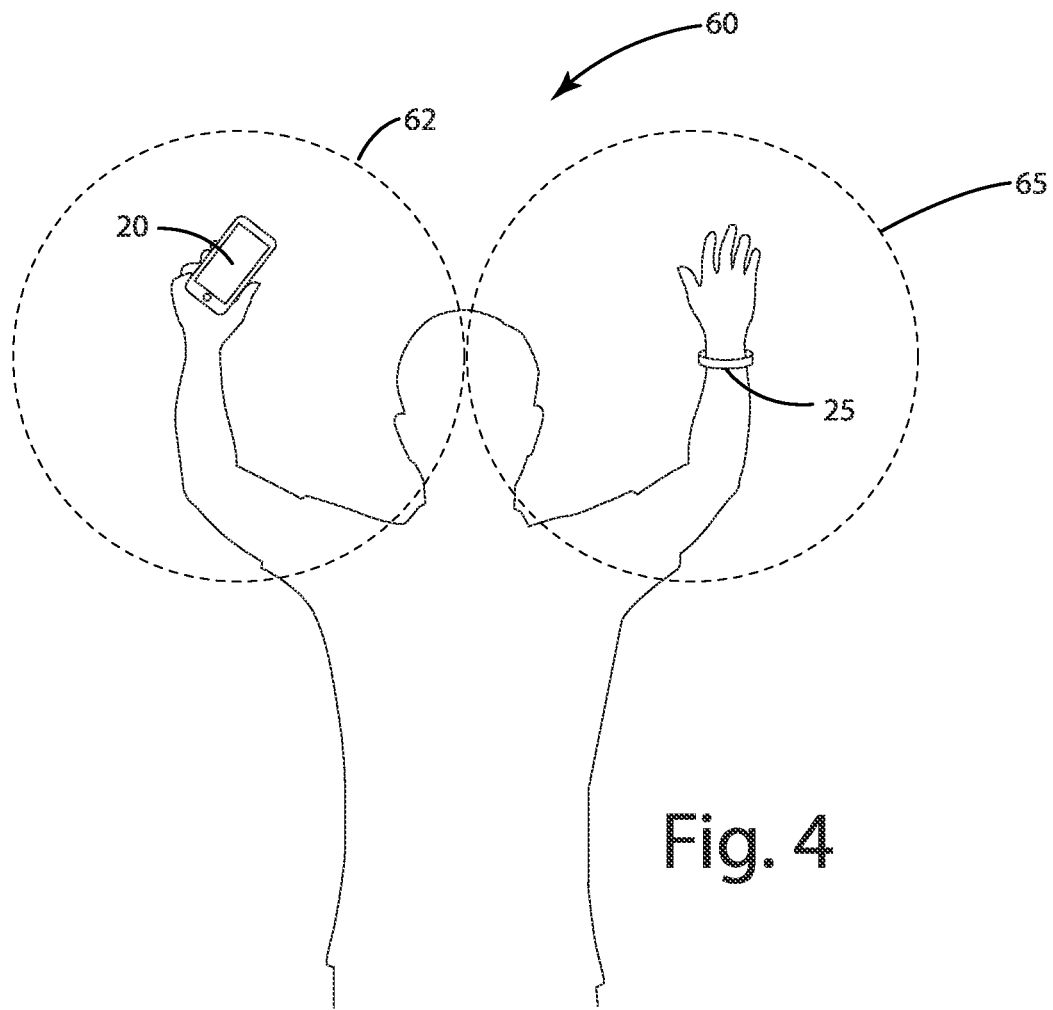
FIG. 4 shows a representative view of a user carrying both a primary portable device and a secondary portable device in accordance with one embodiment.

As described in conjunction with the system 100, the secondary portable device 25 may be a system component with one or more aspects or features incorporated into the object device 50. For instance, the secondary portable device 25 may include a controller 58, a communication interface 53 and an antenna array 30. As shown in FIG. 4, the secondary portable device 25 is shown in conjunction with the primary portable device 20 being worn or carried by a user 60.

The secondary portable device 25 may be a watch or some other portable device likely to be carried or worn in conjunction with the primary portable device 20. For instance, the secondary portable device 25 may be an ear bud, a brooch, a pin, or a ring worn by the user 60. In one embodiment, the secondary portable device 25 may be an Apple Watch worn by the user 60. In one embodiment, the secondary portable device 25 may be the same type of device as the primary portable device 20 or a substantially similar type of device. As an example, the secondary portable device 25 and the primary portable device 20 may both be an iPhone. As another example, the secondary portable device 25 may be an Android-based smart phone, and the primary portable device 20 may be an iPhone. In one embodiment, the primary portable device 20 and the secondary portable device 25 may include different or the same communication capabilities. For instance, the primary portable device 20 may include or use both UWB and BTLE communication capabilities (e.g., a UWB radio and a BTLE radio), and the secondary portable device may include or use one of UWB and BTLE communication capabilities. Alternatively, the primary portable device 20 may include or use one of UWB and BTLE communication capabilities, and the secondary portable device 25 may include or use both UWB and BTLE communication capabilities. It should be understood that one or both of UWB and BTLE may be replaced or supplemented with a different communication protocol or methodology.

In the illustrated embodiment, the secondary portable device 25 is a watch worn by the user 60, and carried in conjunction with the primary portable device 20. As can be seen in the illustrated embodiment, the actual locations of the primary and secondary portable devices 20, 25 are different—although the primary and secondary portable devices 20, 25 are in proximity to each other by virtue of being carried by the user 60.

The primary portable device 20 in the illustrated embodiment may be associated with a primary zone 62, which may be indicative of a location of the primary portable device 20 within a degree of confidence. The primary zone 62 depicted in the illustrated embodiment as a sphere, but it should be understood that the zone may be defined by any type of surface with no boundary (e.g., the surface of a sphere, the surface of a cube, or the surface of a cylinder). The output from the locator of the system 100 may be indicative of a location of the primary portable device 20 within a range of confidence defined as the primary zone 62. The primary zone 62 is shown in the illustrated embodiment with a 90% confidence range defining a spherical surface approximately 2 feet in diameter with respect to the actual location of the primary portable device 20. In practice, the 90% confidence range corresponding to the primary zone 62 may be larger or smaller depending on accuracy of the locator of the system 100. For instance, the primary zone 62 at 90% confidence may be a spherical surface approximately 6 inches in diameter.

The secondary portable device 25 in the illustrated embodiment may be associated with a secondary zone 65, which may be defined in a manner similar to the primary zone 62. For instance, the secondary zone 65 may be indicative of a confidence range with respect to a determined location of the secondary portable device 25. In the illustrated embodiment, the secondary zone 65 is depicted as a spherical surface, but like the primary zone 62, the secondary zone 65 may be defined differently.

In one embodiment, the system 100 may determine proximity back to the primary and secondary portable device 20, 25. For instance, the system 100 may determine whether the primary portable device 20 is within a threshold range of the secondary portable device 25. This threshold range may correspond to a range of distances considered indicative of the primary and secondary portable devices 20, 25 being within the same zone or being carried or worn by the same user 60, or both. The determination of whether the primary and secondary portable devices 20, 25 are within the threshold range may be based on a comparison of the primary and secondary zone 62, 65. For instance, if a surface boundary of the primary zone 62 is within the threshold range of a surface boundary of the secondary zone 65, the primary and secondary portable devices 20, 25 may be considered proximal to each other. Alternatively, a location of the primary portable device 20 as determined by the locator of the system 100 may be compared against a location of the secondary portable device 25 as determined by the locator system 100 to determine the two locations are within the threshold range. In yet another alternative embodiment, the location of the primary portable device 20 may be approximated as the centroid of the primary zone 62, and the location of the secondary portable device 25 may be approximated at the centroid of the secondary zone 65. The positions of the two centroids may be compared against each other to determine if they are within the threshold range.

In one embodiment, the system 100 may define one or more zones with respect to the object 10, and determine whether the primary portable device 20 and the secondary portable device 25 are within the same zone. The one or more zones may be predefined or dynamically defined. Based on a determination that both devices are in the same zone, the system 100 may consider both devices to be in proximity to each other. In one embodiment, if both devices are in different zones, the system 100 may consider the primary portable device 20 to be distant from or not proximal to the secondary portable device 25. In one embodiment, the zones for the primary and secondary portable devices 25 may be different, but the type of zones may be consistent with authorization with respect to an object command. For instance, if the primary portable device 20 is determined to be within the object (e.g., inside a vehicle), and the secondary portable device 25 is determined to be outside the object but in proximity thereto, the object device 50 may direct the object to enable an unlocking and/or mobilization function. The command may be enabled passively or actively, such as by the user pushing a button on the secondary portable device 25.

In one embodiment, the secondary portable device 25 may receive communication parameters pertaining to communications with the object device 50. The communication parameters may be received from the primary portable device 20, and may correspond to communications via a protocol or communication link that is the same or different from a communication link or protocol between the primary portable device 20 and the object device 50. For instance, the communication parameters may pertain to BTLE, which may also be used by the primary portable device 20 to communicate with the object device 50. As another example, the secondary portable device 20 may receive communication parameters for ultra-wide band, while the primary portable device 20 communicates via BTLE. This may enable communication with secondary portable device 25 without the secondary portable device 25 having to scan for connections. In other words, the secondary portable device 25 may advertise, receive communication parameters from the primary portable device 20, and communicate with the object device 50 in accordance with the communication parameters. This may facilitate reducing power usage over a scan-based methodology.

III. Locator

Figure 5:
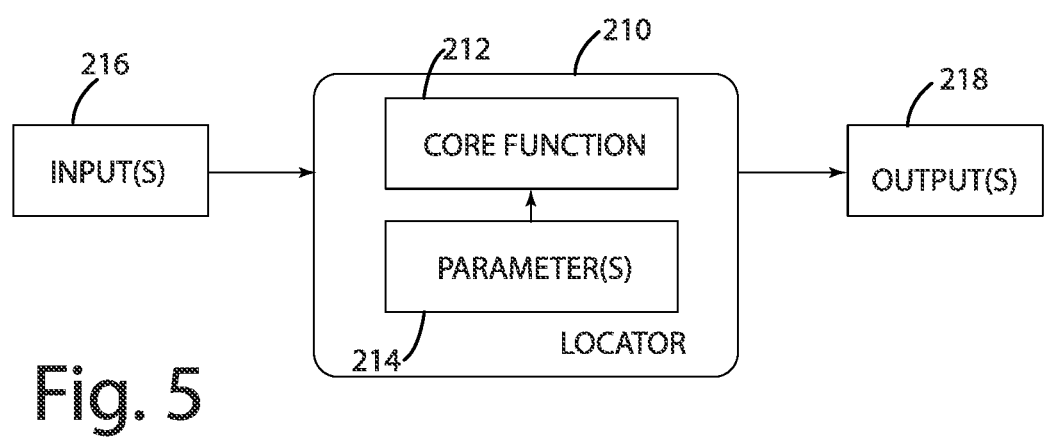
FIG. 5 shows a locator of the system in accordance with one embodiment.

The system 100 in the illustrated embodiment of FIGS. 1-5 may be configured to determine location information about the primary portable device 20 relative to the object 10, or the secondary portable device 25 relative to the object 10. The location information may be indicative of an exterior location of the primary or secondary portable device 20, 25, or both, relative to the object 10, or the location information may be indicative of an interior location of the primary or secondary portable device 20, 25 within the object 10, or a combination thereof. In one embodiment, a locator may be configured to determine this location information. A locator in accordance with one embodiment is depicted in FIG. 5 and generally designated 210. The locator 210 may be configured to receive one or more inputs 216, such as one or more signal characteristics of wireless communications transmitted by the primary portable device 20 and received by one or more sensors 40. The inputs may be translated to one or more outputs 218 corresponding to the location information.

It should be understood that the inputs 216 are not limited to signal characteristics of wireless communications. The inputs 216 may include one or more measurements of characteristics or parameters other than wireless communications, such as an object state (e.g., a door is open) or a previous location or zone determination, or any combination thereof. Additionally, or alternatively, the inputs 216 may be indicative of a state of the object 10 or another device in the system 100. For instance, in the context of a vehicle, one or more of the inputs 216 may indicate that one or more of the vehicle doors are open or closed, or whether a window is open or closed.

The locator 210 in the illustrated embodiment may be incorporated into the object device 50. For instance, the controller 58 of the object device 50 may incorporate the locator 210, and be communicatively coupled to one or more of the sensors 40 via the communication interface 53.

The locator 210 may include a core function or locator algorithm 212 that is configured to receive the one or more inputs 216 and to generate the one or more outputs 218 indicative of a location of the primary portable device 20 relative to the object 10. As discussed herein, the one or more inputs 216 may vary from application to application. Examples of inputs 216 include one or more signal characteristics of the communications, such as signal strength (RSSI), angle of arrival (AOA), and time of flight (TOF).

Figure 6:
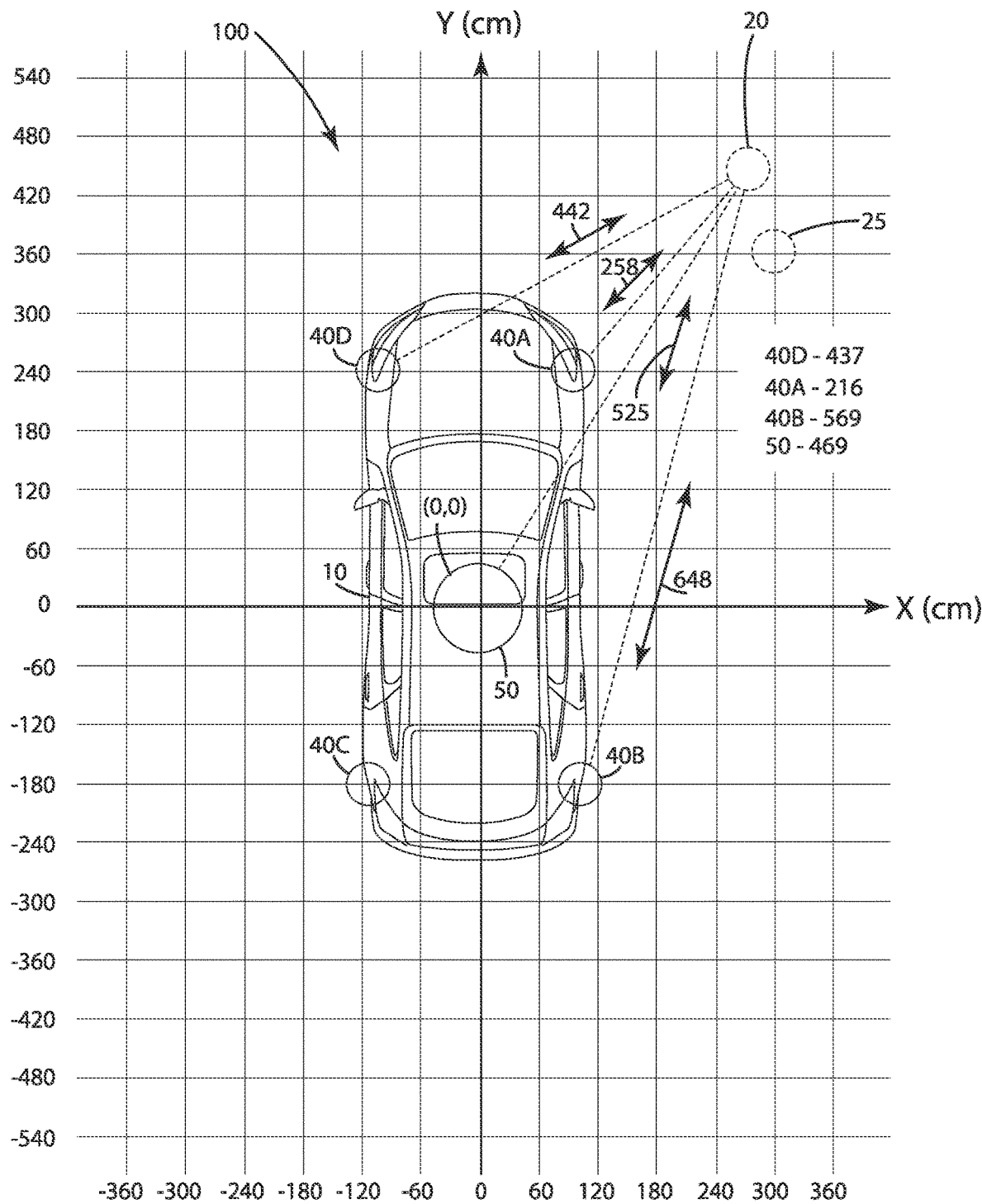
FIG. 6 shows a representative view of a signal characteristic pertaining to one or more devices disposed at different locations in accordance one embodiment.

In the illustrated embodiment of FIG. 6, the system 100 is provided in conjunction with an object 10 that is a vehicle. The object 10 may be different in other applications. The system 100 in the illustrated embodiment includes an object device 50 and a plurality of sensors 40A-D disposed in a fixed position on the object 10, such that these devices comprise fixed position devices. The locations of the sensors 40A-D and the object device 50 may vary from application to application; however, for purposes of disclosure the object device 50 is disposed generally in a center of the vehicle and the sensors 40A-D are disposed at the four corners of the vehicle. A grid is shown in the illustrated embodiment to facilitate discussion in conjunction with the locator 210.

In the illustrated embodiment of FIG. 6, the primary portable device 20 is disposed at X, Y coordinates 270 cm, 450 cm relative to the origin (0 cm, 0 cm) provided at the center of the object 10. The sensors 40A, 40B, 40D are respectively positioned at 258 cm, 648 cm, and 442 cm relative to the primary portable device 20. In one embodiment, a signal characteristic of communications (e.g., RSSI) transmitted from the primary portable device 20 and received by each of the sensors 40A, 40B, 40D and the object device 50 may be translated by the locator 210 to a distance or location relative to each respective sensor 40A, 40B, 40D. (Sensor 40C is shown and left out of this determination in the illustrated embodiment because a portion of the vehicle obstructs the line of sight between the primary portable device 20 and the sensor 40C, potentially preventing a valid measurement of a signal characteristic of communications.)

The illustrated embodiment also depicts the secondary portable device 25 in relation to the object 10. The secondary portable device 25 is disposed at X, Y coordinates 300 cm, 360 cm relative to the origin (0 cm, 0 cm) provided at the center of the object 10. The sensors 40A, 40B, 40D are respectively positioned at 216 cm, 569 cm, and 437 cm relative to the secondary portable device 25. Similar to the primary portable device 20, a signal characteristic of communications transmitted from the secondary portable device 25 and received by each of the sensors 40A, 40B, 40D and the object device 50 may be translated by the locator 210 to a distance or location of the secondary portable device 25 relative to the object 10. In one embodiment, based on a distance determination with respect to each of the sensors 40A, 40B, 40D and the object device 50, and known locations of the sensors 40A, 40B, 40D and the object device 50, the locator 210 may determine a location of the secondary portable device 25 relative to the object 10.

The locator 210 in one embodiment may translate the signal characteristic obtained from a sensor 40 or the object device 50 to a distance metric or other parameter in a variety of ways, including, for instance, a translation table for each fixed position device or type of fixed position devices, fingerprinting or other heuristic (e.g., a machine learned translator). An example of a translation table is shown in chart form in the illustrated embodiment of FIG. 7 and generally designated 600.

Figure 7:
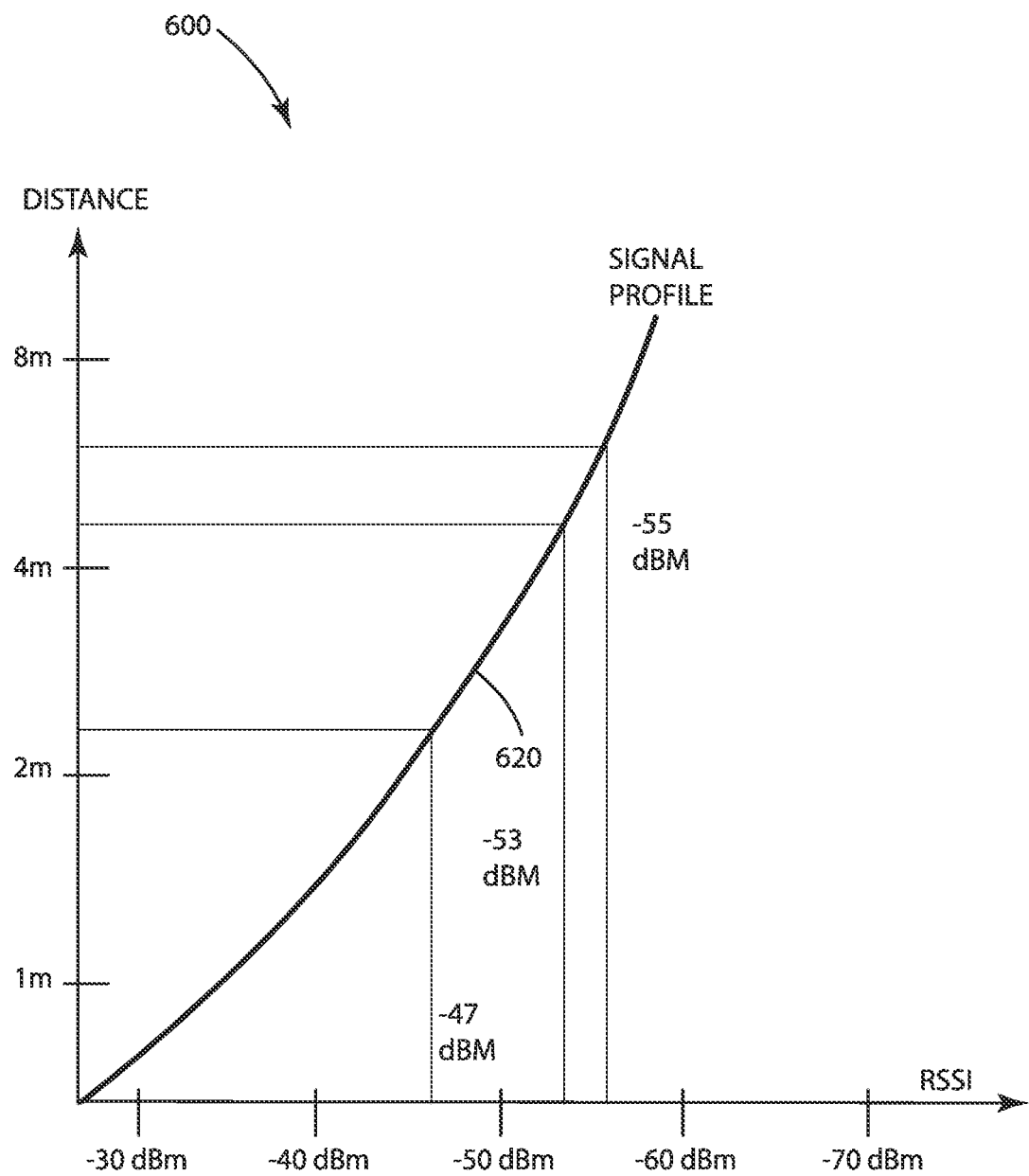
FIG. 7 shows a translation of a signal characteristic to a distance in accordance with one embodiment.

In the illustrated embodiment of FIG. 7, the translation table 620 is operable to translate RSSI to a distance for each of the sensors 40A, 40B, 40D. Returning to the illustrated embodiment of FIG. 6, measurements of RSSI for the sensors 40A, 40B, 40D correspond generally and respectively to −47 dBm, −53 dBm, and −55 dBm. These RSSI measurements for each sensor 40A, 40B, 40D may be translated directly to distance measurements based on the translation table 620; alternatively, the locator 210 may utilize the RSSI measurement to represent distance in further calculations to determine the position of the primary portable device 20 relative to the object 10.

In the illustrated embodiment, with the three distances determined relative to each of the sensors 40A, 40B, 40D based on the outdoor translation table 620, the locator 210 may determine a location of the portable device by trilateration of the three distances given known positions of the sensors 40A, 40B, 40D. It should be noted that the present disclosure is not limited to trilateration as part of the locator algorithm 212; a variety of additional or alternative functions may form part of the locator algorithm 212, as discussed herein, including a distance function, a triangulation function, a lateration function, a multi-lateration function, a fingerprinting function, a differential function, a time of flight function, a time of arrival function, a time difference of arrival function, an angle of departure function, a geometric function, etc., or any combination thereof.

The locator algorithm 212 of the reference locator 210 may be tunable according to a plurality of parameters 214 of the reference locator 210. Example parameters include the following: sensor offsets (e.g., RSSI or AOA offsets, or both), zone offsets (e.g., thresholds and hysteresis parameters), and distance conversion (e.g., constants or equations, or both). Based on the one or more inputs 216 and the values of the plurality of parameters 214, the locator function 212 may provide an output 218 indicative of a location of the reference device 200 relative to the object 10. The locator algorithm 212 may vary from application to application.

Figure 9:
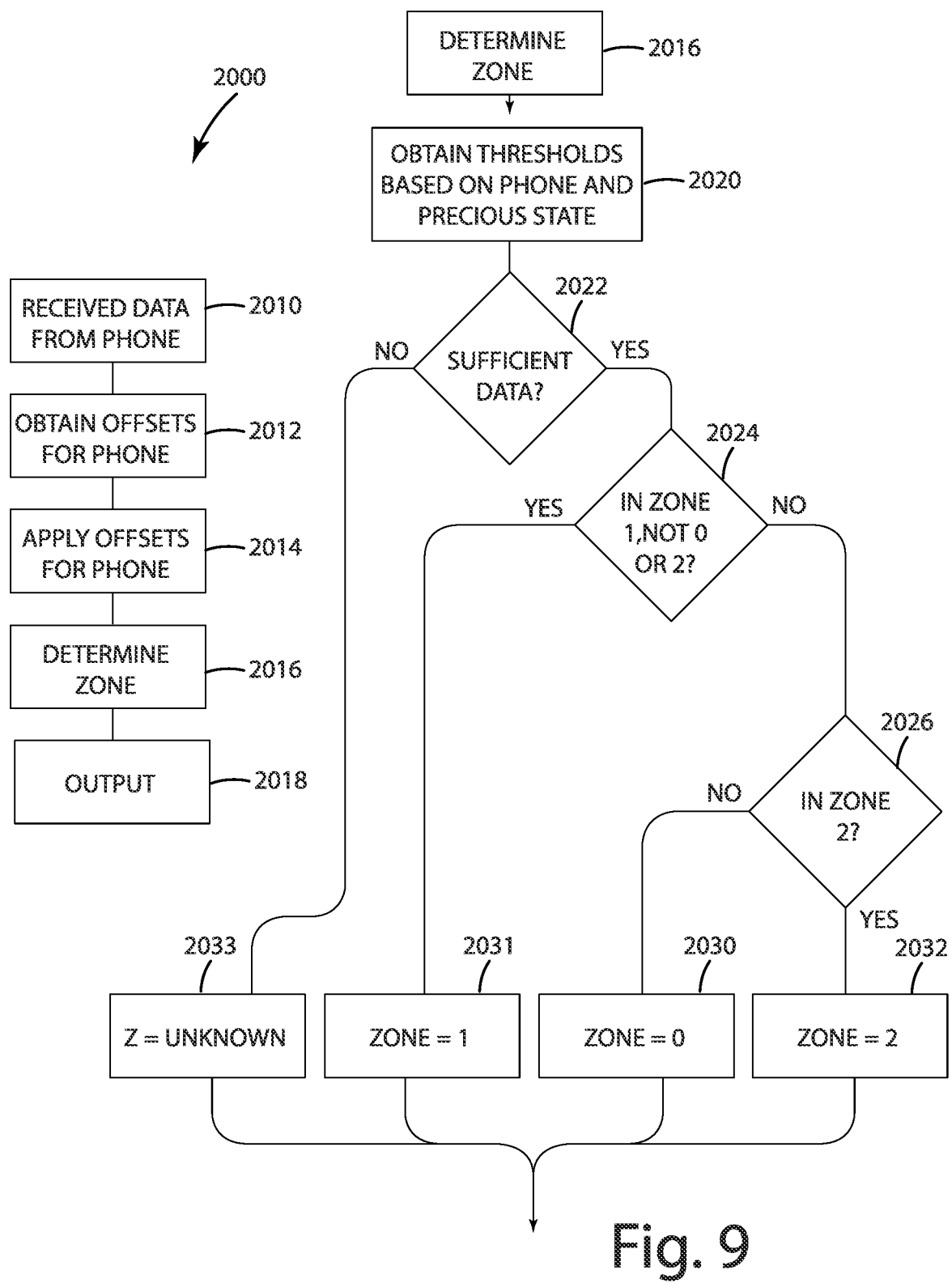
FIG. 9 shows a method of determining location for a locator in accordance with one embodiment.

A method of determining location in accordance with one embodiment of the locator algorithm 212 is depicted in FIG. 9 and generally designated 2000. The method of FIG. 9 may include receiving data from the device or inputs 216, obtaining offsets for the device (e.g., reference locator and/or adaptor locator offsets), applying the offsets to the received data, and determine the zone as an output 218. Steps 2010, 2012, 2014, 2016, 2018. The zone determination may include obtaining one or more thresholds based on the type of device and a previous state, which, as an example, may be previous zone determination. Step 2020. The method may include determining if there is sufficient data, and if not generating an output indicative of the zone being unknown. Step 2022, 2033. If there is sufficient data, the locator may determine, based on the data, the thresholds, the offsets, variability indicators, hysteresis settings, or another parameter or measurement, or any combination thereof, if the device is located in zone 1 (e.g., inside) and not zone 0 (e.g., far away) or 2 (e.g., near). Step 2024, Step 2031. An alternative set of zones may be driver side (0), inside (1) or passenger side (2)—although it should be understood the present disclosure is not so limited. Based on a similar determination to Step 2024, the locator may determine if the device is in zone 2, and if so, provide an output accordingly. Steps 2026, 2032. If the device is determined not to be in zone 2, the locator may output that the device is in zone 0. Step 2026, 2030.

In another example, locator algorithm 212 may be a neural network (e.g., a convolutional neural network with one or more layers), and the one or more parameters may include weights of nodes within the neural network. The weights may be adjusted during training of the locator 210 with samples obtained from a primary portable device 20, a secondary portable device 25 or both, the object 10 and truth information obtained with respect to the samples. The samples may correspond to one or more inputs 216 provided to the locator 210 in training and during use without truth information to determine a location of the primary portable device 20 and/or the secondary portable device. As discussed herein, the inputs 216 may include signal characteristics of communications but are not so limited. In one embodiment, the inputs 216 may include signal strength characteristics of BTLE communications (e.g., obtained via sniffing by sensors 40 and/or direct communications) and time of flight characteristics of UWB communications (e.g., obtained by direct communications). In one embodiment, the inputs 216 to the locator 210 may be based on an output of a locator, similar to the locator 210 but configured to receive inputs and generate an output that is supplied as one or more of the inputs 216 to the locator 210. For instance, a first locator may be adapted to receive signal strength characteristic information pertaining to BTLE communications with the primary portable device 20, and to generate an output indicative of a location of the primary portable device 20. A second locator may be adapted to receive this output and time of flight information pertaining to UWB communications with the primary portable device 20, and to generate an output indicative of the location of the primary portable device 20. Alternatively, the second locator may not receive the output from the first locator, and the outputs of the first and second locators may be provided to a third locator, which accepts the location information generated from the first and second locators as inputs and generates an output indicative of a location of the primary portable device 20. It is noted that one or more inputs described in these examples may alternatively or additionally correspond to sensor information obtained with respect to communications with the secondary portable device 25.

In a vehicle, there may be many antennas in accordance with one embodiment of the system 100, where each of the antennas may be in a different location with a different orientation. All or a subset of the antennas and associated devices, such as the object device 50 or the sensor 40, may obtain signal characteristic measurements, such as RSSI or TOA, or both, simultaneously.

Because a variety of factors can affect one or more signal characteristics of communications between the receiver and transmitter, to facilitate tuning the locator 210 and the locator algorithm 212, samples may be obtained for the one or more signal characteristics under a variety of conditions. Example variations in conditions can include purposefully rotating the primary portable device 20 in all directions, as well as obtaining test samples at different heights to ground, to force testing or obtaining samples to cover a large percentage of all possible angles/orientations.

IV. Method of Authorizing an Object State

Figure 8:
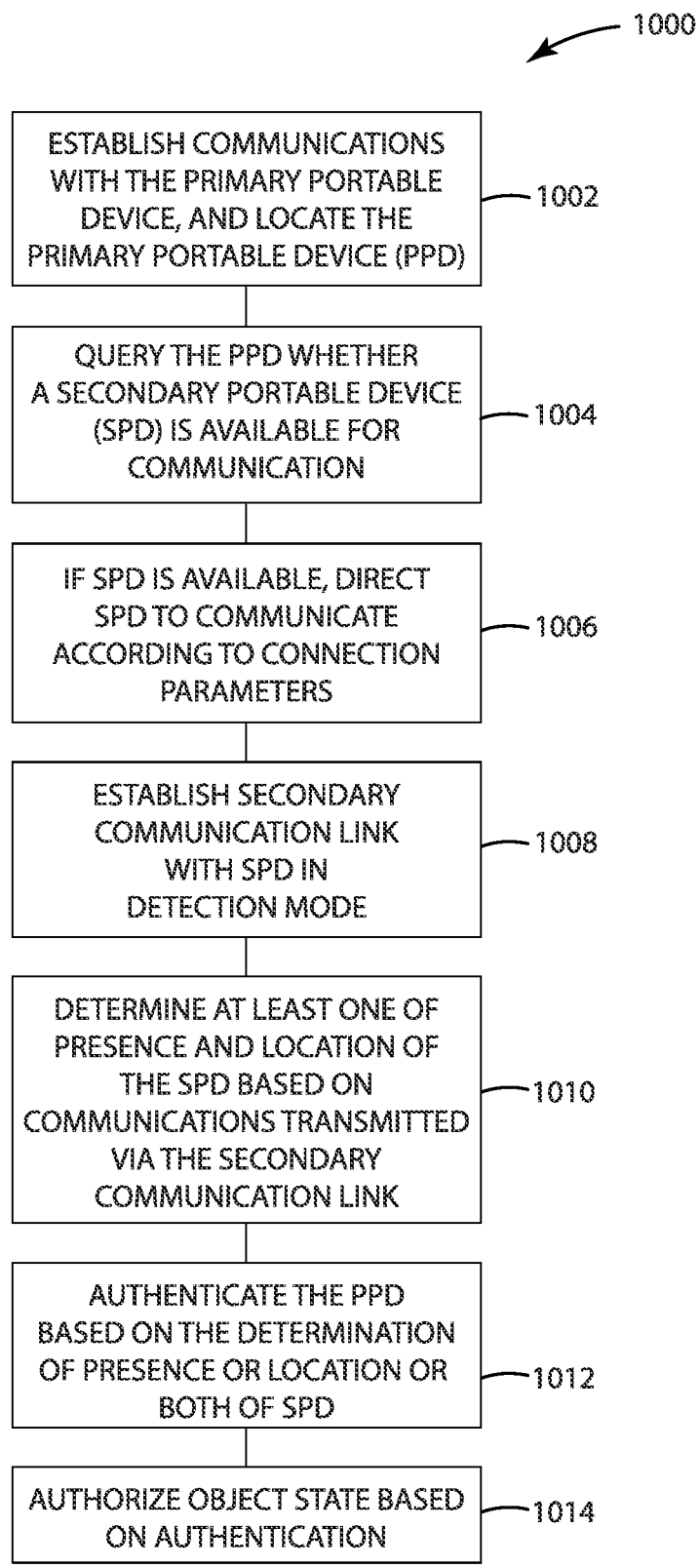
FIG. 8 shows a method of authorizing an object state in accordance with one embodiment.

A method of authorizing an object state of the object 10 is provided in the illustrated embodiment of FIG. 8 and generally designated 1000. Authorization of the object state may be based on communications received by the object 10 from the primary portable device 20 and the secondary portable device 25. In one embodiment, the secondary portable device 25 may not be configured to communicate with the object 10 for authorizing the object state prior to receipt of one or more communication parameters from the primary portable device 20.

The object state may correspond to a command or action with respect to the object 10. It should be noted that authorization for an object state may not include transitioning to the object state; rather, authorization may involve the object 10 determining to allow a transition to the object state. In one embodiment, the object 10 may be configured to transition to the object state in response to authorizing the object state. Alternatively, the object 10 may be configured to transition to the object state in response to one or more criteria being satisfied. As an example, the object 10 may transition to the object state in response to receipt of a command from the primary portable device 20 to transition to the object state. In a more specific version of this example, in the realm of vehicles, a command to unlock a door or to start the vehicle may be authorized prior to receipt of the command based on communications received from the primary portable device 20 and the secondary portable device 25, and then carried out in response to receipt of the command.

Authorization for the object state may be based on communications received from the primary portable device 20 and the secondary portable device 25. In one embodiment, one or more signal characteristics may be determined in at least one of the object device 50 and one or more sensors 40 with respect to received communications from the primary portable device 20. The one or more signal characteristics may be provided to the locator 210, which may determine a location of the primary portable device 20.

In one embodiment, the primary portable device 20 may be configured to communicate with the secondary portable device 25. For instance, the secondary portable device 25 may be paired via BTLE to communicate with the primary portable device 20. The secondary portable device 25 may not be configured to communicate with the object 10 for purposes of authorizing the object state prior to receipt of one or more communication parameters from the primary portable device 20.

The primary portable device 20 may be configured to communicate with the object device 50 of the object 10. In the illustrated embodiment of FIG. 1, the primary portable device 20 may establish a wireless connection with the object 10 via a primary communication link 140. The wireless connection in the illustrated embodiment is a BTLE connection, but it should be understood that the present disclosure is not so limited. Another type of wireless connection may be established.

In establishing the primary communication link 140 using BTLE with the object device 50, the primary portable device 20 may initially operate as a central device with the object device 50 operating as a peripheral device. As the primary portable device 20 moves into proximity to the object device 50 or within range of BTLE communications with the object device 50, the primary portable device 20 may receive advertisements from the object device 50 operating as a peripheral device and establish a first wireless connection with the object device 50. At this stage, the object device 50 and the primary portable device 20 may negotiate to switch roles with the object device 50 becoming the central device and the primary portable device 20 becoming the peripheral device. The object device 50 may communicate one or more connection parameters to the primary portable device 20 to facilitate establishing a second wireless connection, for which the primary portable device 20 is the peripheral device and the object device 50 is the central device.

In one embodiment, the object device 50 may provide the one or more communication parameters to one or more of the sensors 40 via an auxiliary communication link 130, which may be wired or wireless, or a combination thereof. For instance, the auxiliary communication link 130 may be similar to the primary communication link 140 but facilitate communication using a different wireless connection. For instance, the auxiliary communication link 130 may occur via a CAN-FD communication link, a LIN communication link, or a wireless BTLE communication link, or a combination thereof. As another example, the primary communication link 140 and the auxiliary communication link 130 may be based on BTLE but utilize different wireless connections. After the one or more sensors 40 receive the one or more communication parameters utilized for the second wireless connection between the primary portable device 20 and the object device 50, the one or more sensors 40 may monitor communications transmitted from the primary portable device 20 and generate one or more signal characteristics with respect to these communications. As an example, the one or more sensors 40 may utilize the communication parameters as a basis for sniffing communications between the primary portable device and the object device 50 without actively being involved in such communications. The one or more sensors 40 may generate one or more sensed characteristics based on the sniffed communications, and communicate sensed information indicative of the sensed characteristics via the auxiliary communication link 130.

Information pertaining to the one or more signal characteristics, such as the values obtained for the one or more signal characteristics, may be transmitted via the auxiliary communication link 130 to the object device 50, which may provide the information to the locator 210 to determine a location of the primary portable device 20 relative to the object 10. Step 1002.

In one embodiment, the user 60 may be carrying the secondary portable device 25, which the user 60 may have configured to communicate with the primary portable device 20 in a standard connection mode. The standard connection mode may vary from application to application, and may vary over a duration of the wireless connection, or from one wireless connection to another, between the secondary portable device 25 and the primary portable device 20. The standard connection mode may pertain to the primary use case for the secondary portable device 25 in conjunction with the primary portable device 20. For example, the secondary portable device 25 may be a smart watch having BTLE capabilities, and configured to communicate alerts and other information to the user 60 based on information received from the primary portable device 20 in the standard connection mode.

In one embodiment, the secondary portable device 25 may receive one or more connection parameters to communicate in a detection mode different from the standard connection mode. The detection mode may include transmitting communications from the secondary portable device 25 to facilitate a presence determination or a location determination with respect to the secondary portable device 25. The communications transmitted in the detection mode may be significantly greater in number than would otherwise occur in the standard connection mode. For instance, the ratio of messages transmitted from the secondary portable device 25 between the detection mode and the standard connection mode may be 10:1, 5:1, or 2:1 for a given time period. Additionally, or alternatively, the secondary portable device 25 may be configured to communicate over multiple communication channels (e.g., difference frequencies) in accordance with the one or more connection parameters received from the primary portable device 20, in a manner different from the standard connection mode.

The method may include the object device 50 querying the primary portable device 20 whether a secondary portable device 25 is configured to communicate wirelessly with the primary portable device 25. Step 1004. If there is such a configuration for wireless communication between the secondary portable device 25 and the primary portable device 20, the object device 50 may communicate a directive to instruct the secondary portable device 25 to communicate according to one or more connection parameters known to the object device 50. This instruction may involve transitioning the secondary portable device 25 from the standard connection mode to the detection mode. Step 1006.

In the illustrated embodiment, the object device 50 of the object 10 may be configured to transmit, to the primary portable device 20, the one or more connection parameters for the detection mode. The primary portable device 20 may communicate the one or more connection parameters, received from the primary portable device 20, to the secondary portable device 25. The one or more connection parameters may be utilized to transmit a plurality of messages via a secondary communication link 142, depicted in the illustrated embodiment of FIG. 1. The secondary communication link 142 may be based on a pre-established link with the primary portable device 20 for the standard connection mode but in accordance with the detection mode. Alternatively, the secondary communication link 142 may be established between the secondary portable device 25 and the object device 50.

The secondary portable device 25 in the illustrated embodiment may communicate with the primary portable device 20 in accordance with the one or more connection parameters via the secondary communication link 142. Step 1008. The secondary portable device 25 may be unaware that the object device 50 is aware of the one or more connection parameters for the secondary communication link 142, and that the object device 50 is using the one or more connection parameters to monitor communications emanating from the secondary portable device 25. In the illustrated embodiment, the object device 50 may share the one or more connection parameters with at least one of the sensors 40 to facilitate monitoring communications emanating from the secondary portable device 25 at more than one location. Based on the communications monitored in at least one of the object device 50 and one or more sensors 40, one or more sensed characteristics may be generated and utilized by the locator 210 to determine at least one of presence and a location of the secondary portable device 25. Detection of presence or location, or both, may be conducted based on communications transmitted from the secondary portable device 25 in a manner similar to the location detection with respect to communications transmitted from the primary portable device 20. However, in the illustrated embodiment, the secondary portable device 25 is configured to communicate with the primary portable device 20 rather than establishing a communication link with the object device 50 similar to the primary communication link 140 established between the primary portable device 20 and the object device 50. The secondary portable device 25 may be a peripheral device according to the BTLE standard, and therefore may advertise and respond to communications from the central device, which may be the primary portable device 20 in this example.

In an alternative embodiment, the secondary portable device 25 may be configured to establish the secondary communications link 142 with the object device 50 based on the one or more connection parameters received from the primary portable device 20. The secondary portable device 25 may be unaware of the object device 50 prior to receipt of the one or more connection parameters. In one embodiment, with this approach, the secondary portable device 25 may not persistently store connection information for communicating with the object device 50, and may establish a secondary communication link 142 with the object device 50 in response to receipt of the one or more connection parameters from the primary portable device 20. In yet another alternative embodiment, the primary portable device 20 may communicate the one or more connection parameters to the object device 50 to facilitate the object device 50 initiating establishment of the secondary communication link with the secondary portable device 25.

In the illustrated embodiment, based on communications transmitted from the secondary portable device 25, the object device 50 or one or more sensors 40, or a combination thereof, may determine the secondary portable device 25 is present. Step 1010. The object device 50 may store, in memory, identifying information with respect to the secondary portable device 25 so that this identifying information can be compared against communications emanating from the secondary portable device 25 to identify presence of the secondary portable device 25. In one embodiment, if presence of the secondary portable device 25 is not detected, the object device 50 may be configured to abstain from authorizing the object state despite communications with the primary portable device 20 being consistent with authorization for the object state. In this way, the object device 50 may authorize the object state based on 1) communications with the primary portable device 20 being consistent with such authorization (e.g., a location of the primary portable device 20 being in an authorized zone for the object state) and 2) presence of the secondary portable device 25 being detected based on communications transmitted from the secondary portable device 25. In other words, presence of the secondary portable device 25 may be used for purposes of authentication—e.g., an unauthorized person may have obtained the primary portable device 20, but without having the secondary portable device 25, that unauthorized person is not authenticated as having authorization for the object state.

In one embodiment, based on communications transmitted from the secondary portable device 25, the object device 50 of the object 10 may determine a location of the secondary portable device 25. Step 1010. This may be conducted in a manner similar to that described in conjunction with determining a location of the primary portable device 20 based on communications transmitted from the primary portable device 20. For instance, one or more signal characteristics may be determined with respect to communications transmitted from the secondary portable device 25, and these one or more signal characteristics may be provided to a locator 210 (possibly the same locator 210 used for determining location of the primary portable device 20, a different locator, or an adapted version of the locator 210) to determine the location of the secondary portable device 25. For instance, the location of the secondary portable device 25 may be based on a plurality of signal strength measurements with respect to transmissions from the secondary portable device 25 and a translation table as described in conjunction with the illustrated embodiment of FIG. 7. As described herein, in one embodiment, the transmissions from the secondary portable device 25 may be provided via the secondary communication link 142 established between the secondary portable device 25 and the primary portable device 20. Alternatively, the secondary communication link 142 may be established differently, such as between the secondary portable device 25 and the object device 50.

Based on at least one of a determined presence and a determined location of the secondary portable device 25, the object device 50 may be configured to authenticate and authorize or not authorize the object state. Steps 1012, 1014. For instance, the object device 50 in one embodiment may be configured to only authorize an object state if the determined locations of the secondary portable device 25 and the primary portable device 20 are indicative of both devices being in the same zone or in proximity to each other. The zones may be predetermined or dynamically determined. For instance, a zone may be pre-determined as a region relative to the object 10. More specifically, in the context of a vehicle, examples of pre-determined zones include a region proximate the driver-side door that is exterior to the vehicle cabin and within 3 feet of the driver-side door, a driver-side seat region, a front passenger-side seat region, a left or rear passenger seat region, a trunk region proximate to a trunk lid or door that is exterior to the trunk space and within 3 feet of the trunk lid or door. An example of a dynamic zone is a union between regions proximate the determined locations of the secondary portable device 25 and the primary portable device 20. If the two regions are within a threshold distance of each other (determined relative to the edge of the regions or the determined locations of the devices), a zone may be determined as a union of the two regions. In this example, the definition of the zone yields both devices within the zone; however, it should be understood that zones may be defined differently and it is not necessary that both devices be present in the zone.

Alternatively, a distance between the primary and secondary devices based on the determined locations for both devices may be compared against a threshold distance. If the distance is less than or equal to the threshold distance, the object device 50 may authorize an object state. If the distance is greater than the threshold distance, the object device may abstain from authorizing the object state.

In one embodiment, the object device 50 may utilize the determined location of the secondary device 25 to enhance confidence of the location determination for the primary portable device 20. As discussed herein, the secondary portable device 25 may be considered a device likely to be carried or worn by a user 60 in conjunction with the primary portable device 20. For this reason, it may be assumed that the secondary portable device 25 is in close proximity to the primary portable device 20. And based on this assumption (which is likely to be correct), a determined location of the secondary portable device 25 may be analyzed in conjunction with the determined location of the primary portable device 25 to estimate the location of the primary portable device 20 with greater confidence. For instance, if the secondary portable device 25 is assumed to be carried by the user 60, it may be assumed that the secondary device 25 is within X range (e.g., 2-3 feet) of the primary portable device 20. If the primary portable device 20 is determined to be at a first location, and the secondary portable device 25 is determined to be at a second location, the two locations may be compared against each other to estimate a location of the user 60 or the primary portable device 20 with a greater degree of confidence. In one embodiment, the location of the user 60 may be estimated as the mean location between the first and second locations determined with respect to the primary portable device 20 and the secondary portable device 25.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for communicating between an object and a primary portable device, the primary portable device being movable relative to the object, said system comprising:
   the primary portable device including:
      an antenna system configured to communicate wirelessly with a first device of the object via a primary communication link and to communicate wirelessly with a second device of the object via a secondary communication link, said first and second communication links being different communication links;
      a memory to store one or more connection parameters for communicating wirelessly with the object;
      a controller operably coupled to said antenna system, said controller configured to direct wireless communications with the object via said antenna system;
   said antenna system of the primary portable device configured to communicate with the first device of the object according to a first communication protocol, wherein a first signal characteristic is determined with respect to communications between said antenna system and the first device of the object;
   said antenna system of said primary portable device configured to communicate with the second device of the object according to a second communication protocol different from said first communication protocol, wherein a second signal characteristic is determined with respect to communications between said antenna system and the second device of the object; and
   wherein a location of said primary portable device is determined based on said first and second signal characteristics determined for wireless communications respectively between said primary portable device and the first and second devices according to the first and second different communication protocols.

2. The system of claim 1 wherein said antenna system is configured to communicate wirelessly with a secondary portable device separate from said primary portable device.

3. The system of claim 2 wherein said controller is configured to at least one of a) communicate, to the object, a presence indication with respect to the secondary portable device, and b) transmit said one or more connection parameters to the secondary portable device.

4. The system of claim 2 wherein the secondary portable device is operable to communicate with the first device of the object according to the one or more connection parameters received from said primary portable device.

5. The system of claim 4 wherein the primary portable device and the secondary portable device communicate with the first device of the object according to the same communication protocol.

6. The system of claim 2 wherein the secondary portable device communicates with the object via an ultra-wideband communication link, and wherein said primary portable device communicates with the object via a Bluetooth Low Energy communication link.

7. The system of claim 2 wherein an object status is authorized in response to the location of said primary portable device and a location of the secondary portable device being indicative of the primary portable device and the secondary portable device being in the same zone.

8. A primary portable device movable relative to an object, the primary portable device comprising:
an antenna system configured to communicate wirelessly with a first device of an object via a primary communication link and to communicate wirelessly with a second device of the object via a secondary communication link, wherein said first and second communication links are different communication links;
a memory to store one or more connection parameters for communicating wirelessly with the object;
a controller operably coupled to said antenna system, said controller configured to direct wireless communications with the object via said antenna system;
wherein said antenna system is configured to communicate with the first device of the object according to a first communication protocol, wherein a first signal characteristic is determined with respect to communications between said antenna system and the first device of the object;
wherein said antenna system is configured to communicate with the second device of the object according to a second communication protocol different from said first communication protocol, wherein a second signal characteristic is determined with respect to communications between said antenna system and the second device of the object; and
wherein a location of said primary portable device is determined based on said first and second signal characteristics determined for wireless communications respectively between said antenna system of said primary portable device and with the first and second devices according to the first and second different communication protocols.

9. The primary portable device of claim 8 wherein said antenna system is configured to communicate wirelessly with a secondary portable device separate from said primary portable device.

10. The primary portable device of claim 9 wherein said controller is configured to at least one of a) communicate, to the object, a presence indication with respect to the secondary portable device, and b) transmit said one or more connection parameters to the secondary portable device.

11. The primary portable device of claim 9 wherein the secondary portable device is operable to communicate with the first device of the object according to said one or more connection parameters received from said primary portable device.

12. The primary portable device of claim 11 wherein said primary portable device and the secondary portable device communicate with the first device of the object according to the same communication protocol.

13. The primary portable device of claim 9 wherein the secondary portable device communicates with the object via an ultra-wideband communication link, and wherein the primary portable device communicates with the object via a Bluetooth Low Energy communication.

14. The primary portable device of claim 9 wherein an object status is authorized in response to the location of said primary portable device and a location of the secondary portable device being indicative of said primary portable device and the secondary portable device being in the same zone.

15. A method of communicating between an object and a primary portable device that is movable relative to the object, said method comprising:
communicating wirelessly between the primary portable device and a first device of the object via a primary communication link according to a first communication protocol;
determining a first signal characteristic with respect to communications between the primary portable device and the first device of the object;
communicating wirelessly between the primary portable device and a second device of the object via a secondary communication link according to a second communication protocol different from the first communication protocol, wherein the first and second communication links are different communication links;
determining a second signal characteristic with respect to communications between the primary portable device and the second device of the object;
storing, in memory, one or more connection parameters for communicating wirelessly with the object;
directing wireless communications between the primary portable device and the object; and
determining a location of the primary portable device based on the first and second signal characteristics determined for wireless communications respectively between the primary portable device and the first and second devices according to the first and second different communication protocols.

16. The method of claim 15 comprising communicating wirelessly between the primary portable device and a secondary portable device that is separate from the primary portable device.

17. The method of claim 16 comprising at least one of a) communicating, to the object, a presence indication with respect to the secondary portable device and b) transmitting the one or more connection parameters to the secondary portable device.

18. The method of claim 16 comprising:
receiving, in the secondary portable device, one or more connection parameters transmitted from the primary portable device; and
communicating between the secondary portable device and the first device of the object according to the one or more connection parameters received from the primary portable device.

19. The method of claim 18 wherein the primary portable device and the secondary portable device communicate with the first device of the object according to the same communication protocol.

20. The method of claim 16 wherein the secondary portable device communicates with the object via an ultra-wideband communication link, and wherein the primary portable device communicates with the object via a Bluetooth Low Energy communication link.

* * * * *

UNITED STATES PATENT AND TRADEMARK OFFICE
CERTIFICATE OF CORRECTION

PATENT NO. : 12,445,804 B2  
APPLICATION NO. : 17/497460  
DATED : October 14, 2025  
INVENTOR(S) : Eric J. Smith et al.

It is certified that error appears in the above-identified patent and that said Letters Patent is hereby corrected as shown below:

In the Claims

Column 23, Claim 8, Line 61:
"mary portable device and with the first and second"
Should be:
- mary portable device and the first and second -

Signed and Sealed this
Eighteenth Day of November, 2025

John A. Squires
*Director of the United States Patent and Trademark Office*